(12) United States Patent
Holloway

(10) Patent No.: US 12,089,782 B1
(45) Date of Patent: Sep. 17, 2024

(54) FRYING PAN AND METHOD OF USE

(71) Applicant: Graham Holloway, Santa Maria, CA (US)

(72) Inventor: Graham Holloway, Santa Maria, CA (US)

( * ) Notice: Subject to any disclaimer, the term of this patent is extended or adjusted under 35 U.S.C. 154(b) by 309 days.

(21) Appl. No.: 17/460,953

(22) Filed: Aug. 30, 2021

Related U.S. Application Data

(60) Provisional application No. 63/226,879, filed on Jul. 29, 2021, provisional application No. 63/048,166, filed on Jul. 5, 2020.

(51) Int. Cl.
*A47J 37/10* (2006.01)
*A47J 45/06* (2006.01)

(52) U.S. Cl.
CPC ............. *A47J 37/10* (2013.01); *A47J 45/061* (2013.01)

(58) Field of Classification Search
CPC ................................ A47J 37/10; A47J 45/061
USPC ............................................................. 99/422
See application file for complete search history.

(56) References Cited

U.S. PATENT DOCUMENTS

| | | | | |
|---|---|---|---|---|
| 2,198,647 A | * | 4/1940 | Wolcott | A47J 37/10 99/425 |
| D420,553 S | * | 2/2000 | Bell | D7/672 |
| 6,334,386 B1 | * | 1/2002 | Iacchetti | A47J 37/10 99/425 |
| D525,078 S | * | 7/2006 | Hoenstein | D7/359 |
| D648,977 S | | 11/2011 | Malaspono et al. | |
| D699,506 S | * | 2/2014 | Lee | D7/354 |
| D764,858 S | * | 8/2016 | Whitehead | D7/354 |
| 2009/0173239 A1 | * | 7/2009 | Lee | A47J 37/10 99/425 |

OTHER PUBLICATIONS

Texas skillet20201111200421.pdf (Year: 2020).*
Cast Iron Star Shape Pan Handle 5 Points Multipurpose Holder Fry Pan.pdf (Year: 9999).*
Publication—https://www.ebay.com/itm/154306268907?hash=item23ed5eceeb:g:4b0AAOSw3a5gDbWX TVS Ovo Egg shaped Teflon Frying pan Skillet with lid Rare.

* cited by examiner

*Primary Examiner* — Nathaniel E Wiehe
*Assistant Examiner* — Ket D Dang
(74) *Attorney, Agent, or Firm* — Ted Masters

(57) ABSTRACT

A frying pan includes a circular primary cooking surface having a center and a radius. A secondary cooking surface is contiguous with and outwardly projects from the primary cooking surface. The secondary cooking surface downwardly tapers to a rounded end, and has a central axis. A handle having a handle axis is connected to the primary cooking surface. The handle axis forms an angle of between 30 degrees and 60 degrees with the central axis of the secondary cooking surface. The pan wall has a boundary with the primary cooking surface. A point is disposed along the central axis at the boundary, the point being a radial distance from the center of the primary cooking surface. A distance between the point and the rounded end of the secondary cooking surface is at least 18 inches.

9 Claims, 6 Drawing Sheets

FIG. 1
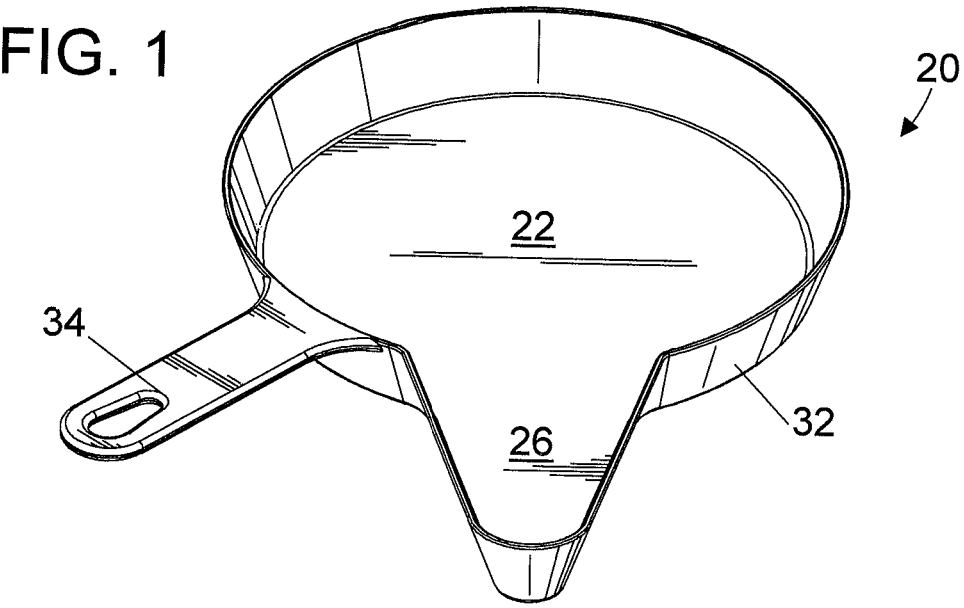
FIG. 2
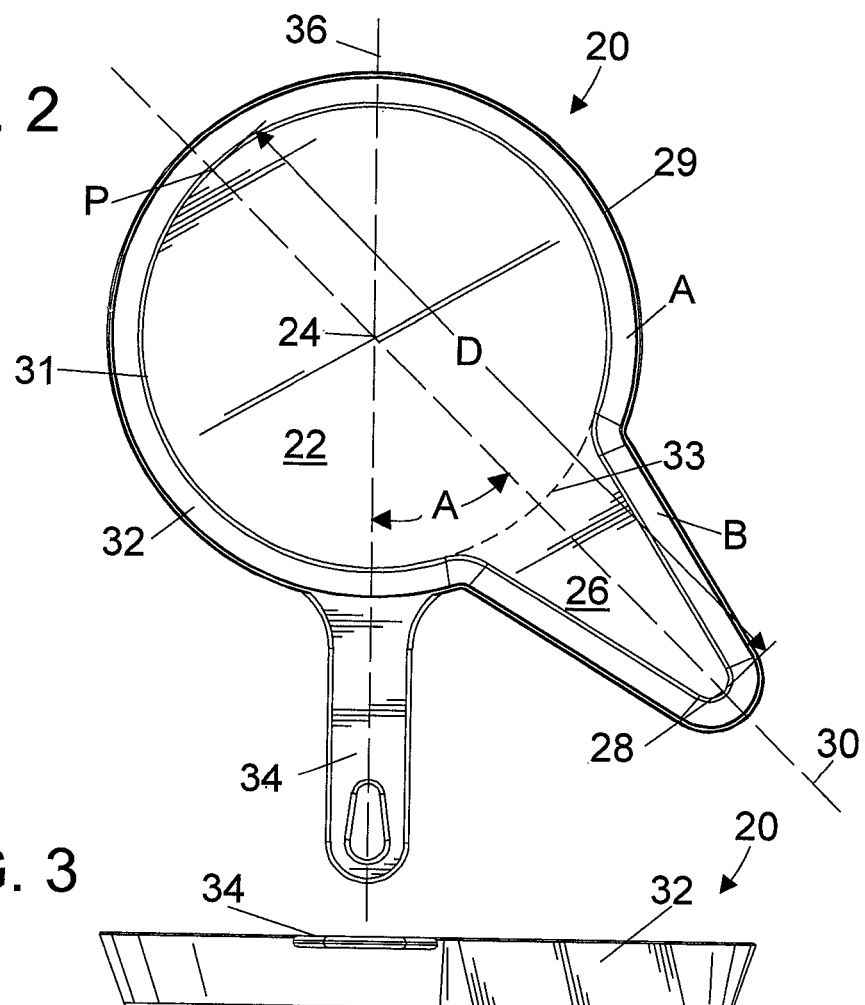
FIG. 3

FRYING PAN AND METHOD OF USE

CROSS REFERENCE TO RELATED APPLICATION

This application claims the filing benefit under 35 U.S.C. § 119(e) of U.S. Provisional Application No. 63/048,166, filed Jul. 5, 1920, which is hereby incorporated by reference. This application also claims the filing benefit under 35 U.S.C. § 119(e) of U.S. Provisional Application No. 63/226,879, filed Jul. 29, 1921 which is hereby incorporated by reference.

TECHNICAL FIELD

The present invention generally pertains to frying pans, and more particularly to a frying pan which has an extended section for receiving food items which would otherwise not fit in the pan.

BACKGROUND OF THE INVENTION

Sometimes circular frying pans cannot accommodate a lengthy bone-in cut of meat or other large item of food. The cut of meat is too long to lie flat in the frying pan. In such instances it is difficult to cook the meat properly.

BRIEF SUMMARY OF THE INVENTION

The present invention is directed to a frying pan which solves the long cut of meat problem by providing a secondary cooking surface which outwardly extends from the primary circular cooking surface. The cut of meat can fit into the extended cooking surface and allow the cut of meat to lie flat in the circular (primary) part of the pan. This provides even cooking and perfect searing. The pan can be fabricated from any useful material including metal, metal alloys such as carbon steel or cast iron, or any other material suitable for frying pans.

In accordance with an embodiment, a frying pan includes a circular primary cooking surface which has a center and a radius. A secondary cooking surface is contiguous with and outwardly projects from the primary cooking surface. The secondary cooking surface downwardly tapers to a rounded end, and has a central axis. A handle is connected to the primary cooking surface and has a handle axis. The handle axis forms an angle of between 30 degrees and 60 degrees with the central axis of the secondary cooking surface.

In accordance with another embodiment, the handle axis forms an angle of 45 degrees with the central axis of the secondary cooking surface.

In accordance with another embodiment, the secondary cooking surface is symmetrically disposed about the central axis.

In accordance with another embodiment, the central axis is disposed counterclockwise from the handle axis.

In accordance with another embodiment, a pan wall has a boundary with the primary cooking surface. A point is disposed along the central axis at the boundary, the point being a radial distance from the center of the primary cooking surface. A distance between the point and the rounded end of the secondary cooking surface is at least 18 inches.

In accordance with another embodiment, the central axis is disposed clockwise from the handle axis.

In accordance with another embodiment, a third cooking surface is contiguous with and outwardly projecting from the primary cooking surface. The third cooking surface is the mirror image about the handle axis of the secondary cooking surface.

Other embodiments, in addition to the embodiments enumerated above, will become apparent from the following detailed description, taken in conjunction with the accompanying drawings, which illustrate, by way of example, the principles of the frying pan and method of use.

BRIEF DESCRIPTION OF THE DRAWINGS

FIG. 1 is a perspective view of a frying pan in accordance with the present invention;

FIG. 2 is a top plan view of the frying pan;

FIG. 3 is side elevation view of the frying pan;

DETAILED DESCRIPTION OF THE INVENTION

Figure 4:
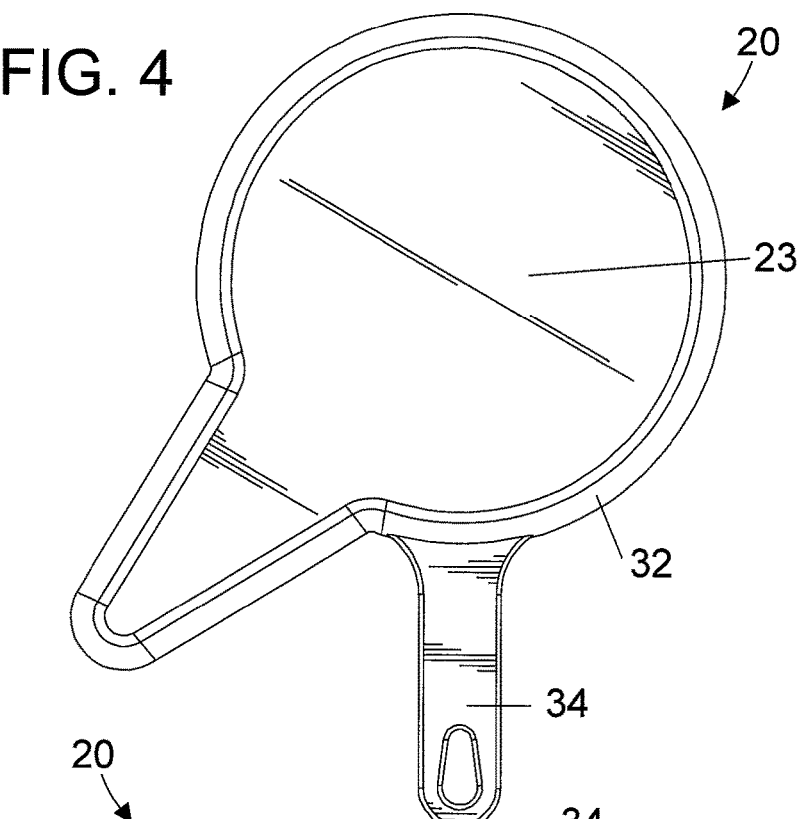
FIG. 4 is a bottom plan view of the frying pan.
Figure 5:
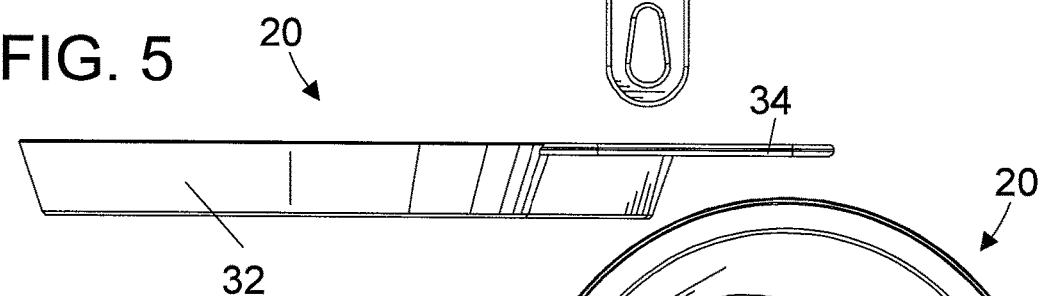
FIG. 5 is a rotated side elevation view of the frying pan.

Referring initially to FIGS. 1-5 there are illustrated perspective, top plan, side elevation, bottom plan, and rotated side elevation views respectively of a frying pan in accordance with the present invention, generally designated as 20. Frying pan 20 includes a circular primary cooking surface 22 having a center 24 and a radius R. In an embodiment, radius R is between six and eight inches, however smaller or larger sizes are also possible. A secondary cooking surface 26 is contiguous with and outwardly projects from primary cooking surface 22. Secondary cooking surface 26 downwardly tapers to a rounded end 28, and has a central axis 30. In the shown embodiment, secondary cooking surface 26 is symmetrically disposed about central axis 30.

Primary 22 and secondary 26 cooking surfaces are the upward-facing surfaces of the bottom 23 of frying pan 20. Primary 22 and secondary 26 cooking surfaces are flat, or substantially flat, and are the surfaces upon which food items are cooked. The primary 22 and secondary 26 cooking surfaces form a boundary 31 with the upstanding pan wall 32 of frying pan 20. The dashed line 33 in FIG. 2 defines the boundary between the primary 22 and secondary 26 cooking surfaces.

Referring to FIG. 2 it is noted that secondary cooking surface 26 is a single surface which outwardly projects from primary cooking surface 22 at one location only. It is also noted that upstanding pan wall 32 surrounds both primary cooking surface 22 and secondary cooking surface 26. Upstanding pan wall 32, has two segments a first segment A and a second segment B. First segment A is circularly disposed around primary cooking surface 22 forming a circular arc of greater than 180 degrees. Second segment B is disposed around secondary cooking surface 26. Also referring to FIG. 2 it is noted that first segment A of upstanding pan wall 32 has a rim 29 which forms an circular arc of greater than 1800 degrees. It is also noted that second segment B of upstanding pan wall 32 includes two straight tapered sides.

A handle 34 is connected (indirectly) to primary cooking surface 22, handle 34 having an handle axis 36. The connection is effected by pan wall 32. Referring particularly to FIG. 2, handle axis 36 forms an angle A of between 30° and 60° with central axis 30 of secondary cooking surface 26. In the shown embodiment, the angle is about 45°. It is noted that central axis 30 is disposed counterclockwise from handle axis 36. That is, in the shown embodiment central axis 30 is to the right of handle axis 36. In FIG. 2 it is also noted that pan wall 32 has boundary 31 with primary cooking surface 22. A point P is disposed along central axis 30 at boundary 31. Point P is a radial distance R from center 24 of primary cooking surface 22. A distance D between point P and rounded end 28 of secondary cooking surface 26 is at least 18 inches. This dimension ensures that cuts of meat 500 18 inches in length (or longer) can be accommodated by frying pan 20 (refer also to FIGS. 6-7).

Figure 6:
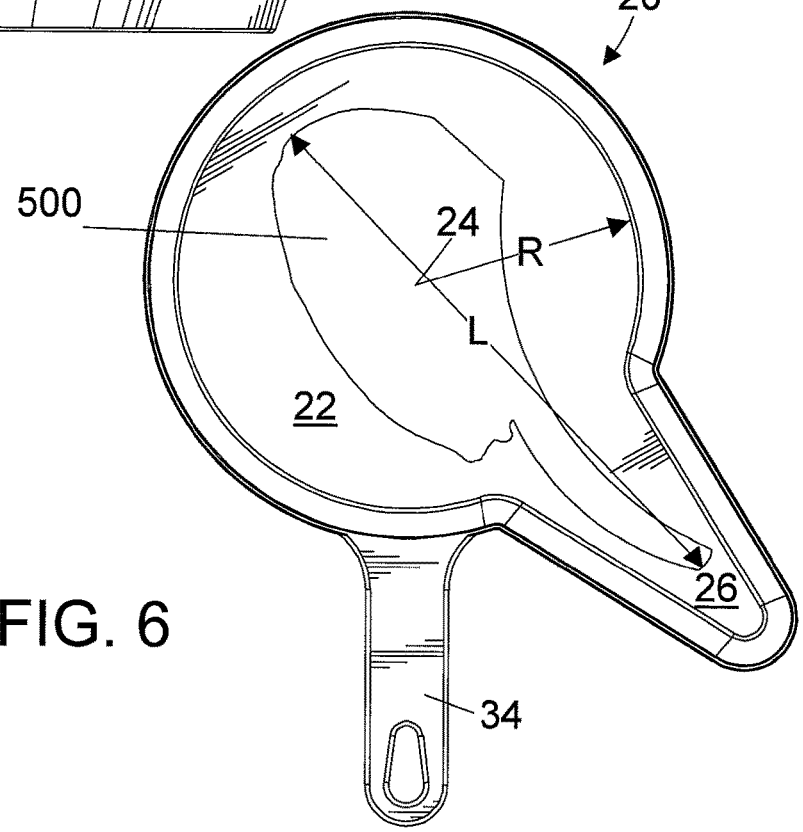
FIG. 6 is a top plan view of the frying pan holding a cut of meat.
Figure 7:
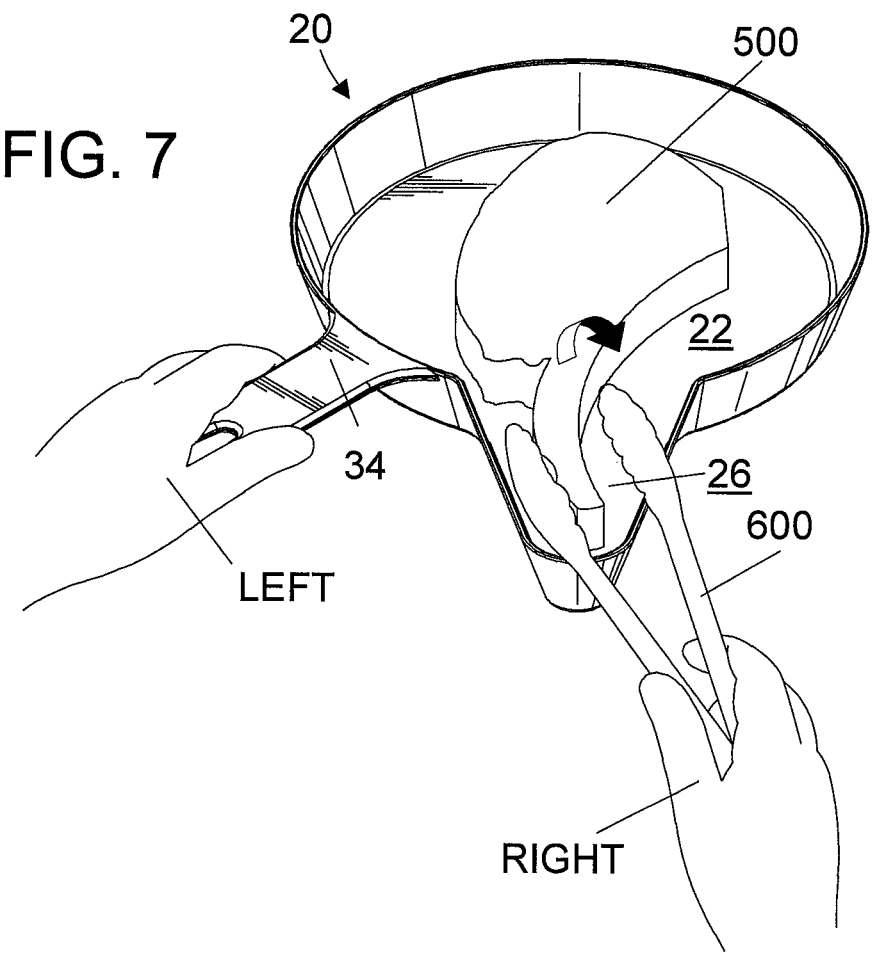
FIG. 7 is a perspective view of the frying pan holding a cut of meat.

FIGS. 6-7 show frying pan 20 holding a cut of meat 500. The cut of meat 500 can be a boneless slab, or can be a bone-in cut (shown). Cut of meat 500 has a length L which is greater that twice the radius R of primary cooking surface 22 (longer that the diameter of the primary cooking surface 22). As such, cut of meat 500 could not be placed flat in primary cooking surface 22 were it not for the extension provided by secondary cooking surface 26. Cut of meat 500 is positioned so that it generally aligns with central axis 30 of secondary cooking surface 26 and can lie flat in primary cooking surface 22, and depending upon the cut of meat 500, can also lie flat on secondary cooking surface 26.

Since most people are right handed, the embodiment shown in FIGS. 1-8 is specifically designed for a right handed user. The user can grip handle 34 with his/her left hand, and use tongs 600 to position (such as to rotate) the cut of meat 500 in frying pan 20 with his/her dominant right hand. The 30°-60° (e.g. 45°) angle A between the handle axis 36 and the central axis 30 of the secondary cooking surface 26 permits the user to hold his/her arms in a comfortable position while gripping handle 34 and using tongs 600.

Figure 8:
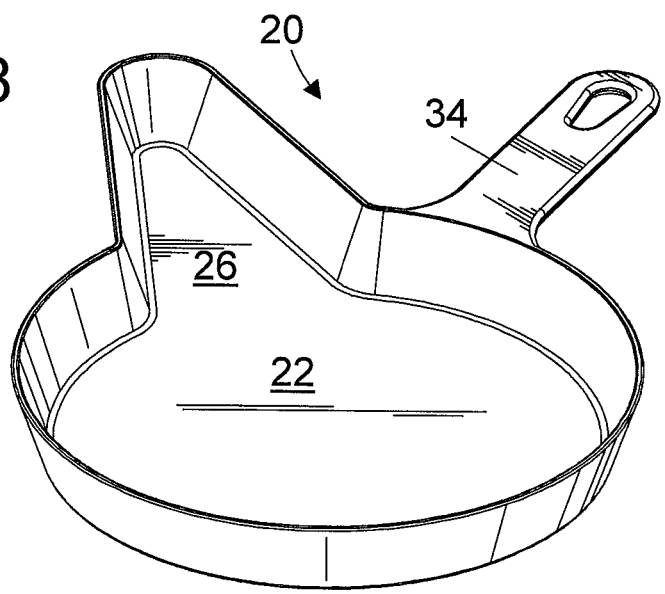
FIG. 8 is a reverse perspective view from FIG. 1.

FIG. 8 is a reverse perspective view from FIG. 1. Shown are primary cooking surface 22, secondary cooking surface 26, and handle 34.

Figure 9:
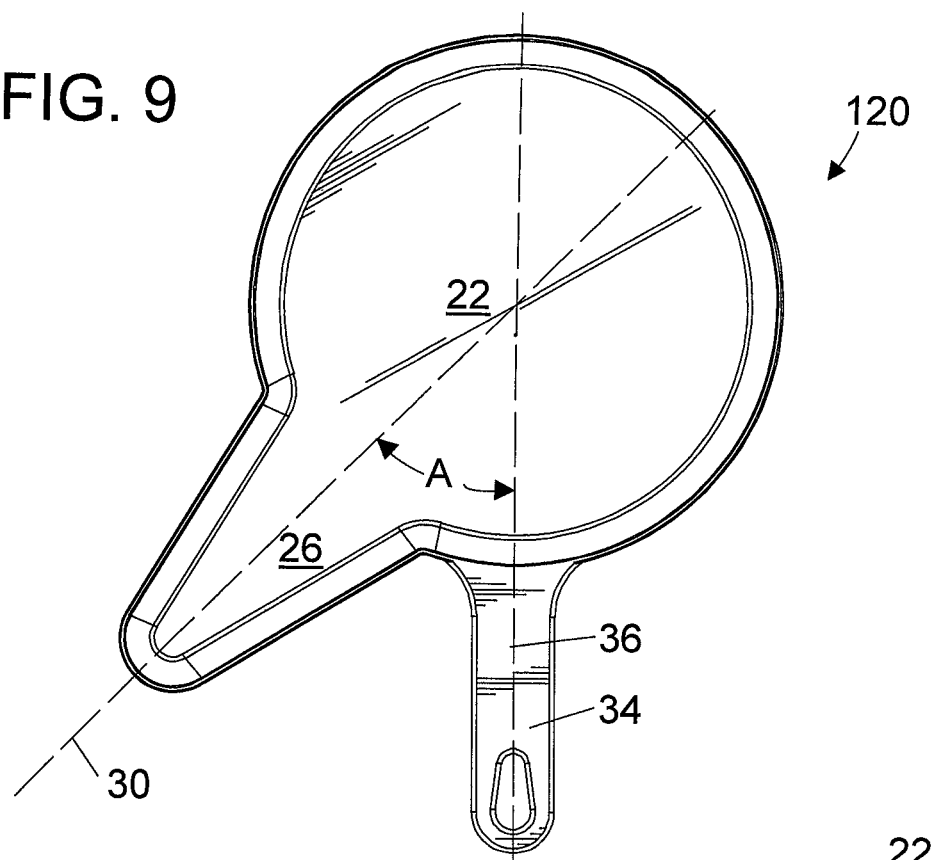
FIG. 9 is a second embodiment of the frying pan.

FIG. 9 is a second embodiment of the frying pan, generally designated as 120. In this embodiment central axis 30 of secondary cooking surface 26 is disposed clockwise from handle axis 36. That is, it is the mirror image of the embodiment of FIGS. 1-8 about handle axis 36. This embodiment benefits users who are left handed.

Figure 10:
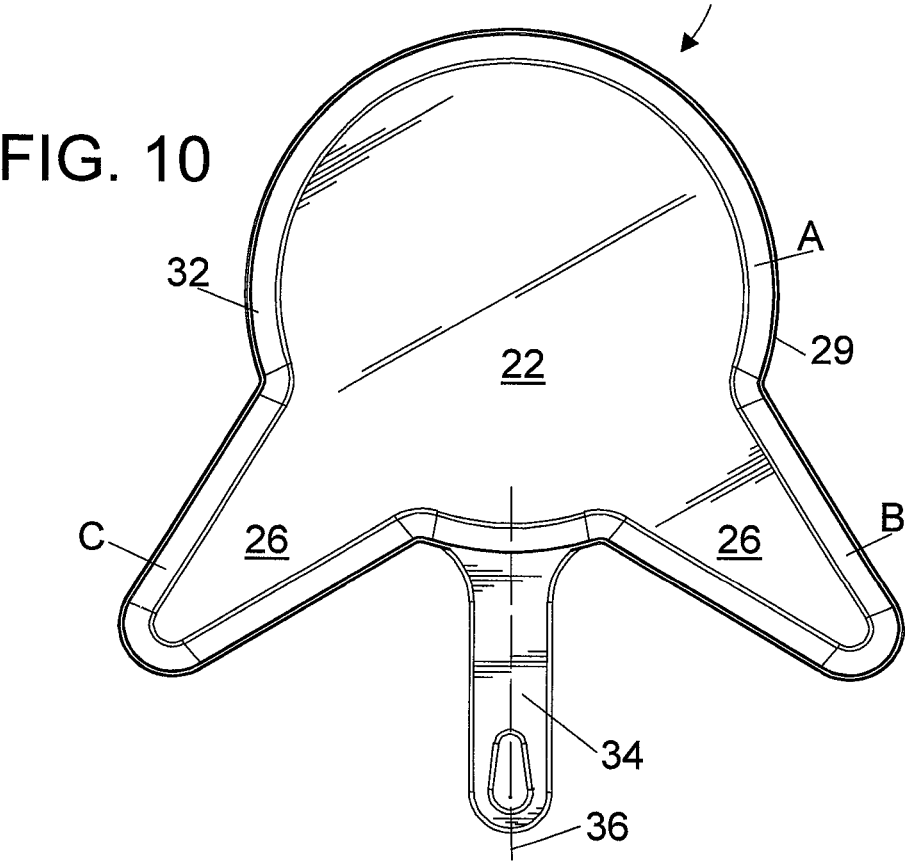
FIG. 10 is a third embodiment of the frying pan.
Figure 11:
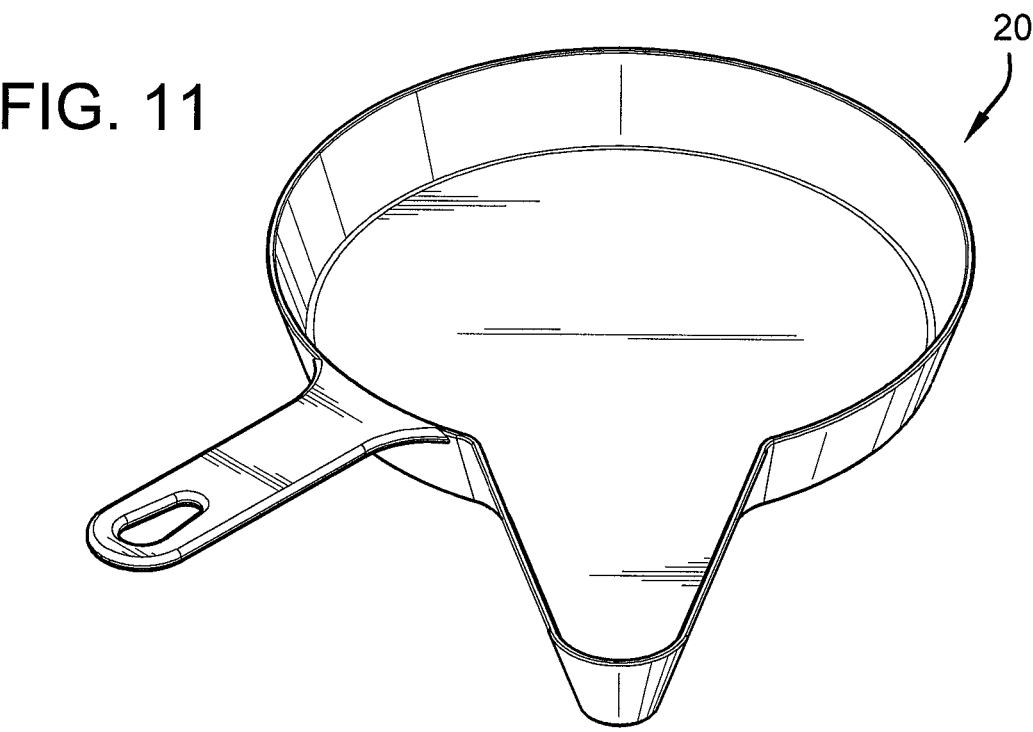
FIG. 11 is a perspective view of a frying pan.
Figure 12:
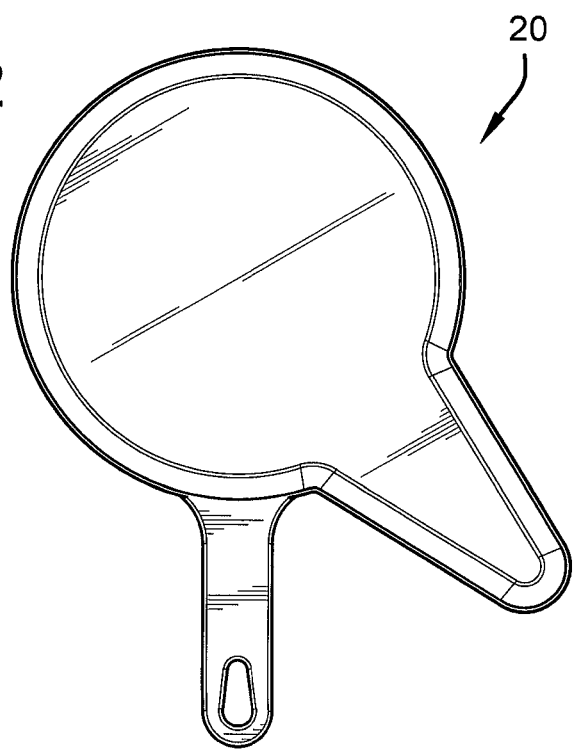
FIG. 12 is a top plan view of the frying pan.
Figure 13:
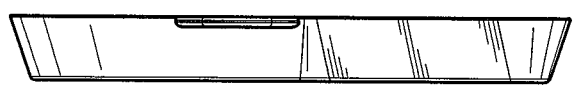
FIG. 13 is side elevation view of the frying pan.
Figure 14:
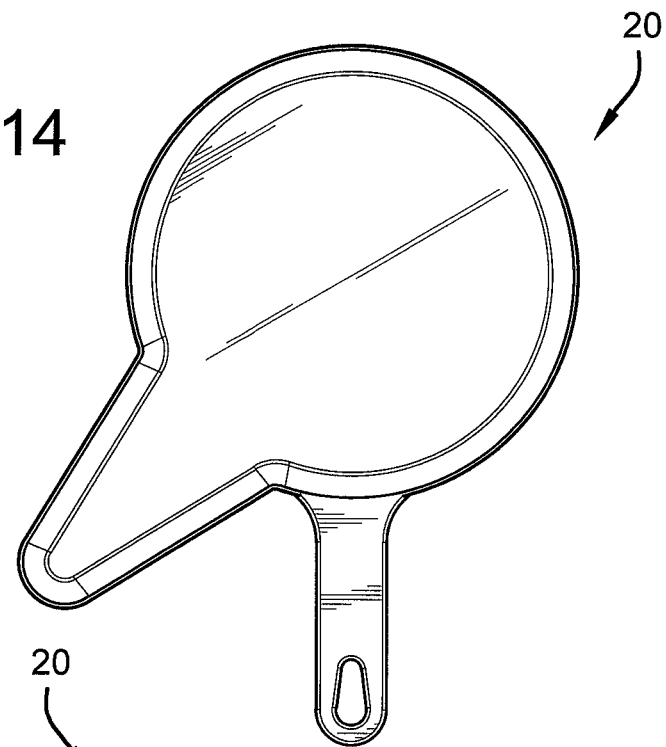
FIG. 14 is a bottom plan view of the frying pan.
Figure 15:
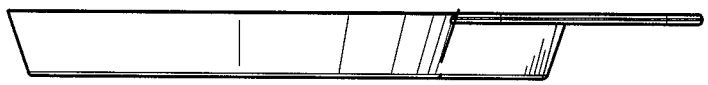
FIG. 15 is a rotated side elevation view of the frying pan.
Figure 16:
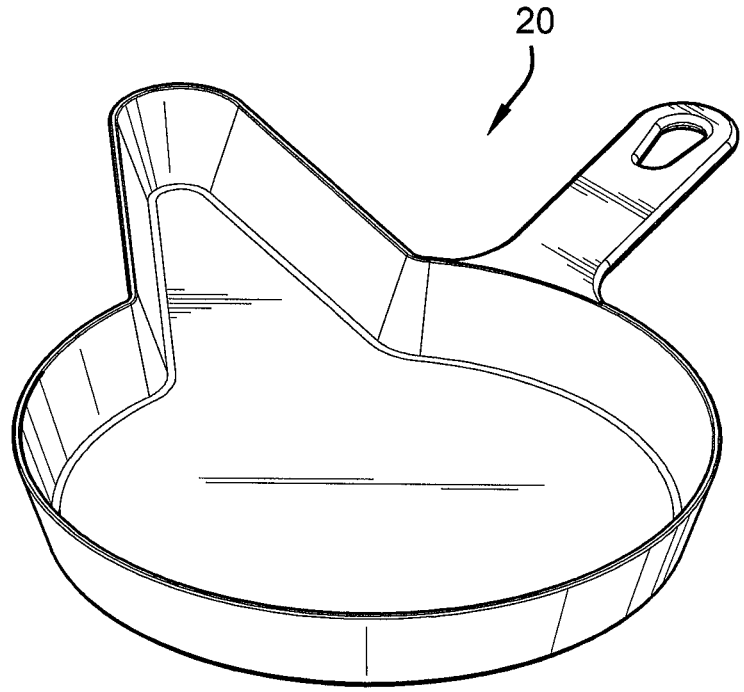
FIG. 16 is a reverse perspective view from FIG. 11.

FIG. 10 is a third embodiment of the frying pan, generally designated as 220. In this embodiment there are two extended cooking surfaces. Secondary cooking surface 26 is included and outwardly projects from primary cooking surface 22 as before in FIGS. 1-8. However, a third cooking surface 38 is also contiguous with and outwardly projects from primary cooking surface 22. Third cooking surface 38 is the mirror image about the handle axis 34 of the secondary cooking surface 26. so that it adds to the single secondary cooking surface 26 of FIGS. 1-8. That is, the third cooking surface 38 is positioned the same as the secondary cooking surface 26 of FIG. 8. As such, this embodiment is applicable to both right and left hand users.

Referring to FIG. 10 it is noted that frying pan 220 has a circular primary cooking surface 22. Exactly two secondary cooking surfaces 26 are contiguous with and outwardly project from said primary cooking surface 22 at two different locations. The two secondary cooking surfaces 26 each downwardly taper to a rounded end. Upstanding pan wall 32 surrounds primary cooking surface 22 and two secondary cooking surfaces 26. Upstanding pan wall has three segments a first segment A, a second segment B, and a third segment C. First segment A is circularly disposed around primary cooking surface 22 forming a circular arc of greater than 180 degrees. Second segment B is disposed around one secondary cooking surface 26, and third segment C is disposed around the other secondary cooking surface 26. It is also noted that first segment A of upstanding pan wall 32 has a rim 29. Rim 29 forms a circular arc of greater than 180 degrees. It is finally noted that the two secondary cooking surfaces 22 are the mirror image of one another about handle axis 36.

In terms of use, a method for a user having right and left hands to cook, includes: (refer to FIGS. 1-10)
(a) providing a frying pan 20, including:
a circular primary cooking surface 22 having a center 24 and a radius R;
a secondary cooking surface 26 contiguous with and outwardly projecting from the primary cooking surface 22;
the secondary cooking surface 26 downwardly tapering to a rounded end 28;
the secondary cooking surface 26 having a central axis 30,
a handle 34 connected to the primary cooking surface 22, the handle 34 having a handle axis 36;
the handle axis 36 forming an angle A of between 30 degrees and 60 degrees with central axis 30 of secondary cooking surface 26;
(b) providing a cut of meat 500 having a length L which is greater than twice the radius R of the primary cooking surface R; and,
(c) (c) positioning the cut of meat 500 generally along the central axis 30 of the secondary cooking surface 26 so the cut of meat 500 lies flat on the primary cooking surface 22.
The method further including;
providing a pair of tongs 600;
after (c), gripping the handle 34 with the left hand and the tongs 600 with the right hand; and,
using the tongs 600 to rotate the cut of meat 500 180°.

The embodiments of the frying pan and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the frying pan and method should be construed as limiting the invention to a particular embodiment or combination of embodiments. The scope of the Invention is defined by the appended claims.

I claim:
1. A frying pan, comprising:
a circular primary cooking surface having a center and a radius;
a secondary cooking surface contiguous with and outwardly projecting from said primary cooking surface;
said secondary cooking surface downwardly tapering to a rounded end, said secondary cooking surface having a central axis;

said secondary cooking surface being a single surface which outwardly projects from said primary cooking surface at one location only;

an upstanding pan wall which surrounds both said primary cooking surface and said secondary cooking surface, said upstanding pan wall having two segments a first segment and a second segment, said first segment circularly disposed around said primary cooking surface forming a circular arc of greater than 180 degrees, and said second segment disposed around said secondary cooking surface;

said first segment of said upstanding pan wall having a rim, said rim forming a circular arc of greater than 180 degrees;

a handle connected to said primary cooking surface, said handle having a handle axis; and said handle axis forming an angle of between 30 degrees and 60 degrees with said central axis of said secondary cooking surface.

2. The frying pan according to claim 1, further including:
said handle axis forming an angle of about 45 degrees with said central axis of said secondary cooking surface.

3. The frying pan according to claim 1, further including:
said secondary cooking surface symmetrically disposed about said central axis; and
said second segment of said upstanding pan wall including two straight tapered sides.

4. The frying pan according to claim 1, further including:
said central axis disposed counterclockwise from said handle axis.

5. The frying pan according to claim 1, further including:
said central axis disposed clockwise from said handle axis.

6. The frying pan according to claim 1, further including:
said upstanding pan wall having a boundary with said primary cooking surface;
a point disposed along said central axis at said boundary, said point being a radial distance from said center of said primary cooking surface; and
a distance between said point and said rounded end of said secondary cooking surface being at least 18 inches.

7. The frying pan according to claim 1, further including:
said secondary cooking surface symmetrically disposed about said central axis;
said second segment of said upstanding pan wall including two straight tapered sides;
said central axis disposed either counterclockwise from said handle axis or counterclockwise from said handle axis;
Said upstanding pan wall having a boundary with said primary cooking surface;
a point disposed along said central axis at said boundary, said point being a radial distance from said center of said primary cooking surface; and
a distance between said point and said rounded end of said secondary cooking surface being at least 18 inches.

8. A frying pan, comprising:
a circular primary cooking surface having a center and a radius;
exactly two secondary cooking surfaces contiguous with and outwardly projecting from said primary cooking surface at two different locations;
said two secondary cooking surfaces each downwardly tapering to a rounded end;
an upstanding pan wall which surrounds said primary cooking surface and said two secondary cooking surfaces, said upstanding pan wall having three segments a first segment, a second segment, and a third segment, said first segment circularly disposed around said primary cooking surface forming a circular arc of greater than 180 degrees, said second segment disposed around one said secondary cooking surface, and said third segment disposed around the other said secondary cooking surfaces;
said first segment of said upstanding pan wall having a rim, said rim forming a circular arc of greater than 180 degrees; and
a handle connected to said primary cooking surface, said handle having a handle axis.

9. The frying pan according to claim 8, further including:
said two secondary cooking surfaces being the mirror image of one another about said handle axis.

* * * * *